United States Patent Office 3,384,671
Patented May 21, 1968

3,384,671
PREPARATION OF DITHIOLS
Rector P. Louthan, Bartlesville, Okla., assignor to Phillips Petroleum Company, a corporation of Delaware
No Drawing. Filed Jan. 18, 1965, Ser. No. 426,419
10 Claims. (Cl. 260—609)

ABSTRACT OF THE DISCLOSURE

Dithiols having terminal SH groups, useful as caulking agents with Epon resins and adhesives, are prepared by reacting an alkali metal sulfide with a sulfur-containing thiotane or a 3-halo-1-propane thiol.

---

This invention relates to the preparation of dithiols. In one aspect, this invention relates to a process for producing dithiols from a particular group of sulfur-containing compounds as starting materials. In another aspect, this invention relates to novel dithiol compounds.

The novel dithiols of this invention can be represented by the formula $$HS(CR_2CR_2CR_2S)_nH$$

wherein each R is selected from the group consisting of hydrogen and alkyl, alkenyl, cycloalkyl, cycloalkenyl, and aryl radicals, and combinations thereof, said radicals having from 1 to 10 carbon atoms each, and the total number of carbon atoms in the recurring units

is at least 3 and preferably not more than 20; and wherein $n$ is an integer of from 3 to 15. The prior art describes a process for preparing 1,3-propanedithiol and bis(3-mercaptopropyl)sulfide. However, none of the processes of the prior art teaches the preparation and isolation of dithiols wherein the recurring units —CR$_2$CR$_2$CR$_2$S— are three or more in number.

Dithiols can be produced in accordance with the present invention by reacting an alkali metal sulfide with a thietane or a 3-halo-1-propanethiol. The use of either the thietane or the 3-halo-1-propanethiol as a starting material results in the formation of a dithiol having substantially the theoretical mercaptan sulfur content.

Accordingly, it is an object of this invention to provide a process for producing dithiols.

Another object of this invention is to provide a process for producing dithiols which have a relatively low molecular weight and a high mercaptan sulfur content.

Still another object of this invention is to provide a process for preparing dithiols from a particular group of sulfur-containing compounds as starting materials.

These and other objects of the invention will become apparent to one skilled in the art after studying the detailed disclosure and the appended claims.

In the practice of the present invention, dithiols having the formula $$HS(CR_2CR_2CR_2S)_nH$$

are prepared by reacting an alkali metal sulfide with a sulfur-containing compound selected from the group consisting of

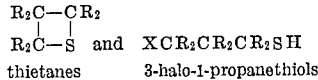

wherein $n$ in the formula representing the dithiols is an integer of from 1 to 15; each R is selected from the group consisting of hydrogen and alkyl, alkenyl, cycloalkyl, cycloalkenyl, and aryl radicals, and combinations thereof such as alkaryl, aralkyl, and the like, said radicals having from 1 to 10 carbon atoms each; and X is a halogen selected from the group consisting of fluorine, chlorine, bromine, and iodine. The R substituents in the recurring units —CR$_2$CR$_2$CR$_2$S— of the dithiols are the same as the R substituents in the thietane or the 3-halo-1-propanethiol used as a starting material because each R remains intact on the carbon atom to which it is attached in the starting material. The total number of carbon atoms in the thietane or the 3-halo-1-propanethiol used as a starting material is at least 3 and preferably not more than 20.

Examples of thietanes which can be used as starting materials in the practice of this invention include thietane (trimethylene sulfide), 2 - methylthietane, 3 - methylthietane, 2-ethylthietane, 3-propylthietane, 2-isopropylthietane, 3-butylthietane, 2-methyl-3-ethylthietane, 2,3,4-trimethylthietane, 2,2,3,3,4,4-hexamethylthietane, 2-hexylthietane, 3-octylthietane, 2-decylthietane, 2-heptyl-3-decylthietane, 3-allylthietane, 2-methyl-4-vinylthietane, 2-(3-butenyl)thietane, 2-cyclohexylthietane, 3-(3-methylcyclopentyl)thietane, 2-(cyclopentylmethyl)thietane, 3-(2-cyclohexen-1-yl)thietane, 2-(4-methyl-2-cyclopenten-1-yl)thietane, 2-phenylthietane, 3-p-tolylthietane, 2-benzylthietane, 2,3-diphenylthietane, and 3-(1-naphthyl)thietane.

Some examples of 3-halo-1-propanethiols which can be used as starting materials in accordance with this invention include 3-fluoro-1-propanethiol, 3-chloro-1-propanethiol, 3-bromo-1 propanethiol, 3-iodo-1-propanethiol, 3-chloro-1-butanethiol, 2-methyl-3-bromo-1-propanethiol, 1-iodo-3-pentanethiol, 1-chloro-5-methyl-3-hexanethiol, 2-methyl-3-bromo-1-butanethiol, 3-methyl-4-fluoro-2-hexanethiol, 2,3,3,4-tetramethyl-4-chloro-2-pentanethiol, 3-bromo-1-nonanethiol, 1-iodo-3-tridecanethiol, 8-chloro-10-eicosanethiol, 5-bromo-1-pentene-3-thiol, 3-iodo-5-hexene-1-thiol, 2-cyclohexyl-3-chloro-1-propanethiol, 1-cyclopentyl-4-bromo-2-butanethiol, 2-(2-cyclopenten-1-yl)-3-iodo-1-propanethiol, 3-phenyl-3-chloro-1-propanethiol, 2-p-tolyl-3-fluoro-1-butanethiol, 3-chloro-4-phenyl-1-butanethiol, and 2-(2-naphthyl)-3-bromo-1-propanethiol.

The alkali metal sulfides which can be used as a reactant include lithium sulfide, sodium sulfide, potassium sulfide, rubidium sulfide, and cesium sulfide. Hydrates of the alkali metal sulfides can also be employed in the practice of this invention. The alkali metal sulfide can be added as such to the reaction vessel or it can be produced within the reaction vessel by reacting, for example, hydrogen sulfide with an alkali metal hydroxide or an alkali metal carbonate. Suitable alkali metal hydroxides which can be reacted with hydrogen sulfide to form the alkali metal sulfide include lithium hydroxide, sodium hydroxide, potassium hydroxide, rubidium hydroxide, and cesium hydroxide. Alkali metal carbonates which can be reacted with hydrogen sulfide to produce the corresponding alkali metal sulfide include sodium carbonate, lithium carbonate, potassium carbonate, rubidium carbonate, and cesium carbonate. One skilled in the art will be able to determine the necessary amounts of reactants which are required to produce the desired ratio of alkali metal sulfide to thietane or 3-halo-1-propanethiol starting material.

When a 3-halo-1-propanethiol is used as a starting material, the mole ratio of the alkali metal sulfide to said thiol should be within the range of from about 0.05:1 to 3:1 and preferably in the range of from about 0.2:1 to 1.5:1. When the mole ratio of said alkali metal sulfide to said thiol is less than 0.55:1, an additional basic substance must be added in an amount sufficient to provide a total of at least 1.1 gram-ions of alkali metal per grammole of thiol starting material. Said additional basic substances which can be used are the hydroxides and carbonates of the alkali metals including lithium, sodium, potassium, rubidium, and cesium. Although it is to be understood that the invention does not depend upon any particular mechanism, it appears that the 3-halo-1-propanethiol starting materials undergo cyclization when treated with a basic substance to form the corresponding thietane as an intermediate in the production of the dithiols of this invention. Since the alkali metal sulfides are basic substances, it is unnecessary to employ any additional basic substance when the mole ratio of alkali metal sulfide to thiol is at least 0.55:1.

When a thietane is used as a starting material, the mole ratio of the alkali metal sulfide to said thietane should be within the range of from about 0.05:1 to 3:1 and preferably in the range of from about 0.2:1 to 1.5:1. When the alkali metal sulfide is formed in the reaction vessel by reacting hydrogen sulfide with an alkali metal hydroxide or an alkali metal carbonate, it is unnecessary to employ more alkali metal hydroxide or alkali metal carbonate than that required to react with the hydrogen sulfide to form the corresponding alkali metal sulfide. When the alkali metal sulfide is added as such to the reaction vessel and a thietane is used as the sulfur-containing starting material, it is unnecessary to employ any alkali metal hydroxide or alkali metal carbonate.

In the practice of this invention, the starting materials are dissolved in a suitable solvent which does not deleteriously react with the components of the reaction mixture. A polar solvent such as water is preferred because it is inexpensive and the products can be recovered with ease. Other polar solvents which can be employed include alcohols such as methanol, ethanol, 1-propanol, 2-propanol, 1-butanol, 2-butanol, 1-hexanol, 1-octanol, 1-decanol, cyclohexanol, ethylene glycol, and 2-methoxyethanol; amides such as formamide, acetamide, N-ethylformamide, N-methylacetamide, N-phenylacetamide, N,N-dimethylformamide, N,N-dimethylacetamide, N-ethyl-N-phenylformamide, caprolactam, N-methylcaprolactam, 2-pyrrolidinone, and 1-methyl-2-pyrrolidinone. Dimethyl sulfoxide can also be used as a solvent for the reactants.

The dithiols of this invention can be prepared by charging the reactants together with the solvent into a suitable vessel or the like. Although the length of time necessary to complete the reaction can vary over a wide range, depending to some extent on the reactivity of the particular starting materials and the temperature employed, it will generally fall within the range of from about 1 minute to about 24 hours. The reaction is usually conducted for a period of from about 5 minutes to about 6 hours. Generally, the reaction temperature will be within the range of from about 50° to 300° C. with the usual temperature being within the range of from about 100° to 200° C. The reaction pressure required is that which is necessary to maintain the reactants and the solvent in a substantially liquid state.

The dithiol reaction products produced in accordance with this invention can be separated from the inorganic components of the reaction mixture by any suitable means such as by solvent extraction of the mixture after acidification. If desired, the reaction mixture can be diluted with water before the extraction step. The solvent extract can then be distilled to separate the lower boiling dithiols. The residue from the distillation step includes the higher molecular weight dithiols which can subsequently be separated into the individual constituents by chromatography or the like.

The dithiols produced in the practice of this invention have utility in admixture with Epon resins to make excellent caulking agents, adhesives, glues and the like. The dithols can also be used as starting materials in the formation of more complex chemicals.

The following examples will serve to illustrate the invention. It is to be understood that such examples are for the sole purpose of illustration and must not be considered to be limiting of the invention.

EXAMPLE I

A mixture comprising 222 g. (3 moles) of trimethylene sulfide, 102 g. (3 moles) of hydrogen sulfide, 240 g. (6 moles) of sodium hydroxide, and 1500 ml. of water was stirred for 1 hour in an autoclave at a temperature of 150° C. The reaction mixture was cooled, acidified with concentrated hydrochloric acid, and extracted with benzene. The extract was then washed with water and the benzene separated and removed under reduced pressure. The residue was then heated to 250° C. at a pressure of less than 1 mm. of Hg without any evidence of thermal decomposition. This yielded a minor amount of a lower boiling material and 155.4 g. of a light-colored liquid residue having a number-average molecular weight of 516 by osmometry. This number-average molecular weight represents an average of 6.5 recurring

—CH$_2$CH$_2$CH$_2$S— units per molecule and a mercaptan sulfur content of 11.7 weight percent. The mercaptan sulfur content was determined by mercuric perchlorate procedure. The calculated mercaptan sulfur content of a dithiol having a molecular weight of 516 is 12.4 weight percent.

EXAMPLE II

A mixture comprising 331.5 g. (3 moles) of 3-chloro-1-propanethiol, 102 g. (3 moles) of hydrogen sulfide, 360 g. (9 moles) of sodium hydroxide, and 1500 ml. of water was stirred for 1 hour in an autoclave at a temperature of 150° C. The reaction mixture was cooled, acidified with concentrated hydrochloric acid, and extracted with benzene. The extract was then washed with water and the benzene separated and removed under reduced pressure. The residue was then heated to 250° C. at a pressure of less than 1 mm. of Hg without any evidence of thermal decomposition. This yielded some lower boiling material and 163.3 g. of a light-colored liquid residue having a number-average molecular weight of 587 by osmometry. This number-average molecular weight represents an average of 7.5 recurring —CH$_2$CH$_2$CH$_2$S— units per molecule and a mercaptan sulfur content of 11.5 weight percent as determined by mercuric perchlorate procedure. The calculated mercaptan sulfur content of a dithiol having a molecular weight of 587 is 10.9 weight percent.

EXAMPLE III

A mixture comprising 331.5 g. (3 moles) of 3-chloro-1-propanethiol, 360 g. (1.5 moles) of sodium sulfide nonahydrate, 120 g. (3 moles) of sodium hydroxide, and 1257 ml. of water was stirred for 30 minutes in an autoclave at a temperature of 150° C. The reaction mixture was cooled, acidified with concentrated hydrochloric acid, and extracted with benzene. The extract was then washed with water and the benzene separated and removed under reduced pressure. The residue was then heated to a temperature of 250° at a pressure of less than 1 mm. of Hg without any evidence of thermal decomposition. This procedure yielded a minor amount of a lower boiling material and 208.6 g. of a light-colored liquid residue having a number-average molecular weight of 545 as determined by osmometry. This number-average molecular weight represents an average of 6.4 recurring —CH$_2$CH$_2$CH$_2$S— units per molecule and a mercaptan sulfur content of 10.3 weight percent as determined by mercuric perchlorate procedure. The calculated mercaptan sulfur content of a dithiol having a molecular weight of 545 is 10.3 weight percent.

EXAMPLE IV

A mixture comprising 331.5 g. (3 moles) of 3-chloro-1-propanethiol, 72 g. (0.3 mole) of sodium sulfide nonahydrate, 120 g. (3 moles) of sodium hydroxide, and 1500 ml. of water was stirred at a temperature of 150° C. in an autoclave for 1 hour. The reaction mixture was cooled, acidified with concentrated hydrochloric acid, and extracted with benzene. The extract was then washed with water and most of the benzene removed under reduced pressure. The residue was then heated to a temperature of 250° C. at a pressure of less than 1 mm. of Hg without any evidence of thermal decomposition. This procedure yielded a minor amount of a lower boiling material and 125.2 g. of a light-colored liquid residue having a number-average molecular weight of 544. This number-average molecular weight represents an average of 6.9 recurring —$CH_2CH_2CH_2S$— units per molecule and a mercaptan sulfur content of 8.9 weight percent. The calculated mercaptan sulfur content of a dithiol having a molecular weight of 544 is 11.7 weight percent.

EXAMPLE V

A mixture comprising 222 g. (3 moles) of trimethylene sulfide, 102 g. (3 moles) of hydrogen sulfide, 240 g. (6 moles) of sodium hydroxide, and 1500 ml. of methanol was heated to a temperature of 150° C. and stirred for 1 hour in an autoclave. The reaction mixture was cooled, acidified with concentrated hydrochloric acid, diluted with water, and extracted with ether. The extract was then washed with water and the ether was volatilized from the washed extract. The residue was then heated to a temperature of 270° C. at a pressure of less than 1 mm. of Hg without any evidence of thermal decomposition. This procedure resulted in a minor amount of a lower boiling material and 161.2 g. of a light-colored liquid residue having a number-average molecular weight of 540. This number-average molecular weight represents an average of 6.8 recurring —$CH_2CH_2CH_2S$— units per molecule and a mercaptan sulfur content of 11.1 weight percent. The calculated mercaptan sulfur content of a dithiol having a molecular weight of 540 is 11.9 weight percent. This example illustrates the feasibility of using methanol as a solvent for the reactants.

EXAMPLE VI

A mixture comprising 222 g. (3 moles) of trimethylene sulfide, 102 g. (3 moles) of hydrogen sulfide, 240 g. (6 moles) of sodium hydroxide, and 1500 ml. of 1-methyl-2-pyrrolidinone was heated to a temperature of 150° C. and stirred for 1 hour in an autoclave. The reaction mixture was cooled, acidified with concentrated hydrochloric acid, diluted with water, and extracted with ether. The ether extract was washed with water and the solvent was volatilized from the washed extract yielding a residue which weighed 261.8 g. This residue was flash distilled until the pot temperature had risen to about 250° C. at a pressure of less than 1 mm. of Hg. The flash distillation resulted in 221.7 g. of distillate and 33.7 g. of a light-colored liquid residue. There was no evidence of thermal decomposition during the distillation step. The 221.7 g. of distillate was then distilled under reduced pressure to yield nine fractions containing a total of about 59 g. of 1,3-propanedithiol, 91 g. of bis(3-mercaptopropyl) sulfide, and 46 g. of 4,8-dithiaundecane-1,11-dithiol. The amounts of each of these components were determined graphically by plotting the refractive index of each fraction against the weight of distillate. A liquid residue of 9 g. remained in the distillation flask. The 1,3-propanedithiol, a center cut of which boiled at 48° C. at 4.5 mm. Hg and had a refractive index of 1.5425 at 20° C., was identified by comparison of its boiling point and refractive index with those of the known compound. The structure was further confirmed through a nuclear magnetic resonance study. The identity of the bis(3-mercaptopropyl) sulfide ($C_6H_{14}S_3$), a center cut of which boiled at 150° C. at 5 mm. and had a refractive index of 1.5629 at 20° C., was determined by analysis for carbon, hydrogen, and mercaptan sulfur.

*Analysis.*—Calcd. for $C_6H_{14}S_3$: C, 39.52; H. 7.75; mercaptan S, 35.16. Found: C, 39.6; H, 7.7; mercaptan S, 32.2.

The identity of the 4,8-dithiaundecane-1,11-dithiol ($C_9H_{20}S_4$), a center cut of which boiled at 223° C. at 5 mm. and had a refractive index of 1.5720 at 20° C., also was determined by analysis for carbon, hydrogen, and mercaptan sulfur.

*Analysis.*—Calcd. for $C_9H_{20}S_4$: C, 42.14; H, 7.86; mercaptan S, 25.0. Found: C, 42.2; H, 7.8; mercaptan S, 23.4.

EXAMPLE VII

A mixture comprising 280.5 g. (1.5 moles) of bis(3-chloropropyl) sulfide, 378 g. (1.6 moles) of sodium sulfide nonahydrate, and 1245 ml. of water was heated to a temperature of 150° C. and stirred for 1 hour in an autoclave. The reaction mixture, in the form of an emulsion, was cooled and treated with one liter of isopropyl alcohol. The mixture was then extracted with one liter of benzene. The benzene was removed from the extract and the residue heated to a temperature of 200° C. at a pressure of less than 1 mm. of Hg. This produced 149.8 g. of residue in the form of a dark, waxy solid having a number-average molecular weight of 795 and a mercaptan sulfur content of only 0.09 weight percent. This illustrates that the polymer formed when bis(3-chloropropyl) sulfide is used as a starting material has a much higher molecular weight and a much lower mercaptan sulfur content than the products formed in accordance with Examples I through VI. It is believed the reason for this shortcoming is that the bis(chloropropyl) sulfide starting material cannot undergo cyclization to form a trimethylene sulfide intermediate such as that which is believed to occur when a 3-halo-1-propanethiol is used as a starting material.

EXAMPLE VIII

A mixture comprising 404 g. (2 moles) of 1,3-dibromopropane, 480 g. (2 moles) of sodium sulfide nonahydrate and 676 ml. of water was heated to a temperature of 150° C. and stirred for 1 hour in an autoclave. The resulting mixture was then cooled, washed with 1 liter of water and 1 liter of benzene, and acidified with concentrated hydrochloric acid. After thorough contact with the aqueous phase, the benzene phase was separated and washed with water. Most of the benzene was then removed from the benzene phase under reduced pressure. The residue was then heated to a temperature of 220° C. at a pressure of about 1 mm. of Hg. This resulted in some thermal decomposition of the material. This produced 130.4 g. of residual product in the form of a dark, waxy solid having a mercaptan sulfur content of 2.2 weight percent and a number-average molecular weight of 3300. This number-average molecular weight represents an average of 44 recurring —$CH_2CH_2CH_2S$— units per molecule. This example illustrates that the polymer formed when 1,3-dibromopropane is used as a starting material is inferior to the products formed in Examples I through VI with respect to state of matter, thermal stability, and molecular weight.

Although the invention has been described in considerable detail, it is to be understood that such detail is for that purpose only and that many variations and modifications can be made without departing from the spirit and scope of the invention.

I claim:
1. A dithiol having the formula

$$HS(CR_2CR_2CR_2S)_nH$$

wherein each R is selected from the group consisting of hydrogen and alkyl, alkenyl, cycloalkyl, cycloalkenyl, and aryl radicals, and combinations thereof, said radicals having from 1 to 10 carbon atoms each, and the total number carbon atoms in the recurring units —$CR_2CR_2CR_2S$— is at least 3 and not more than 20; and wherein n is an integer of from 3 to 15.

2. 4,8-dithiaundecane-1,11-dithiol.

3. A process for producing a dithiol having the formula $HS(CR_2CR_2CR_2S)_nH$ where $n$ is 3 to 15, which comprises reacting an alkali metal mono sulfide with a sulfur-containing compound selected from the group consisting of

and $XCR_2CR_2CR_2SH$ wherein each R is selected from the group consisting of hydrogen and alkyl, alkenyl, cycloalkyl, cycloalkenyl, and aryl radicals; wherein X is a halogen selected from the group consisting of fluorine, chlorine, bromine, and iodine; and wherein the total number of carbon atoms in said sulfur-containing compound is at least 3 and not more than about 20; the mole ratio of said alkali metal sulfide to said sulfur-containing compound being within the range of from about 0.05:1 to about 3:1; said reacting being conducted at a temperature within the range of about 50 to about 300° C.

4. A process according to claim 1 wherein the mole ratio of said alkali metal sulfide to said sulfur-containing compound is within the range of from about 0.05:1 to 3:1 and when said sulfur-containing compound is $$XCR_2CR_2CR_2SH$$

and the mole ratio of said alkali metal sulfide to said $$XCR_2CR_2CR_2SH$$

is less than 0.55:1, an amount of an additional basic substance sufficient to provide a total of at least 1.1 gram-ions of alkali metal per gram-mole of said $$XCR_2CR_2CR_2SH$$

is employed.

5. A process according to claim 2 wherein said additional basic substance is an alkali metal hydroxide selected from the group consisting of lithium hydroxide, sodium hydroxide, potassium hydroxide, rubidium hydroxide, and cesium hydroxide.

6. A process according to claim 2 wherein said additional basic substance is an alkali metal carbonate selected from the group consisting of lithium carbonate, sodium carbonate, potassium carbonate, rubidium carbonate, and cesium carbonate.

7. A process for producing a dithiol having the formula $HS(CR_2CR_2CR_2S)_nH$ where $n$ is 3 to 15, which comprises reacting an alkali metal mono sulfide with a thietane of the formula

wherein each R is selected from the group consisting of hydrogen and alkyl, alkenyl, cycloalkyl, cycloalkenyl, and aryl radicals, said radicals having from 1 to 10 carbon atoms each, and the total number of carbon atoms in said thietane is at least 3 and not more than about 20; and wherein the mole ratio of said alkali metal sulfide to said thietane is within the range of from about 0.05:1 to 3:1; said reacting being conducted at a temperature within the range of about 50 to about 300° C.

8. A process for producing a dithiol having the formula $HS(CR_2CR_2CR_2S)_nH$ where $n$ is 3 to 15, which comprises reacting an alkali metal mono sulfide with a thiol of the formula $$XCR_2CR_2CR_2SH$$

wherein each R is selected from the group consisting of hydrogen and alkyl, alkenyl, cycloalkyl, cycloalkenyl, and aryl radicals, said radicals having from 1 to 10 carbon atoms each, and the total number of carbon atoms in said thiol is at least 3 and not more than about 20; wherein X is a halogen selected from the group consisting of fluorine, chlorine, bromine, and iodine; and wherein the mole ratio of said alkali metal sulfide to said thiol is within the range of from about 0.05:1 to 3:1 and when the ratio of said alkali metal sulfide to said thiol is less than 0.55:1, an amount of an additional basic substance sufficient to provide a total of at least 1.1 gram-ions of alkali metal per gram-mole of said thiol is employed; said reacting being conducted at a temperature within the range of about 50 to about 300° C.

9. A process for producing a dithiol having the formula $$HS(CR_2CR_2CR_2S)_nH$$

$$I$$

wherein $n$ is an integer of from 1 to 15; wherein each R is selected from the group consisting of hydrogen and alkyl, alkenyl, cycloalkyl, cycloalkenyl, and aryl radicals, said radicals having from 1 to 10 carbon atoms each, and the total number of carbon atoms in the recurring units $—CR_2CR_2CR_2S—$ of Formula I is at least 3 and not more than 20; which comprises reacting a sulfur-containing compound selected from the group consisting of

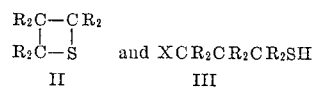

wherein X is a halogen selected from the group consisting of fluorine, chlorine, bromine, and iodine, and each R is the same as in Formula I, with the reaction product obtained by reacting hydrogen sulfide with a basic substance selected from the group consisting of alkali metal hydroxide and alkali metal carbonate; wherein the mole ratio of the reaction product obtained by reacting hydrogen sulfide with said basic substance to said sulfur-containing compound is within the range of about 0.05:1 to about 3:1; said reacting being conducted at a temperature within the range of about 50 to about 300° C.

10. A process for producing $HS(CH_2CH_2CH_2S)_3H$ which comprises reacting trimethylene sulfide with hydrogen sulfide and sodium hydroxide at a temperature of about 150° C., the mole ratio of trimethylene sulfide:hydrogen sulfide:sodium hydroxide employed being about 1:1:2.

References Cited

Reid: Organic Chem. of Bivalent Sulfur, vol. I, p. 25 (1958).

Reid: Organic Chem. of Bivalent Sulfur, vol. II, p. 18 (1960).

CHARLES B. PARKER, *Primary Examiner.*

JOSEPH P. BRUST, *Examiner.*

D. R. PHILLIPS, *Assistant Examiner.*

UNITED STATES PATENT OFFICE
CERTIFICATE OF CORRECTION

Patent No. 3,384,671                      May 21, 1968

Rector P. Louthan

It is certified that error appears in the above identified patent and that said Letters Patent are hereby corrected as shown below:

Column 7, line 19, the claim reference numeral "1" should read -- 3 --; lines 33 and 39, the claim reference numeral "2", each occurrence, should read -- 4 --.

Signed and sealed this 18th day of November 1969.

(SEAL)
Attest:

Edward M. Fletcher, Jr.              WILLIAM E. SCHUYLER, JR.
Attesting Officer                      Commissioner of Patents